March 16, 1943.      H. W. LEVERENZ      2,314,096
LUMINESCENT LAMP
Filed March 22, 1941
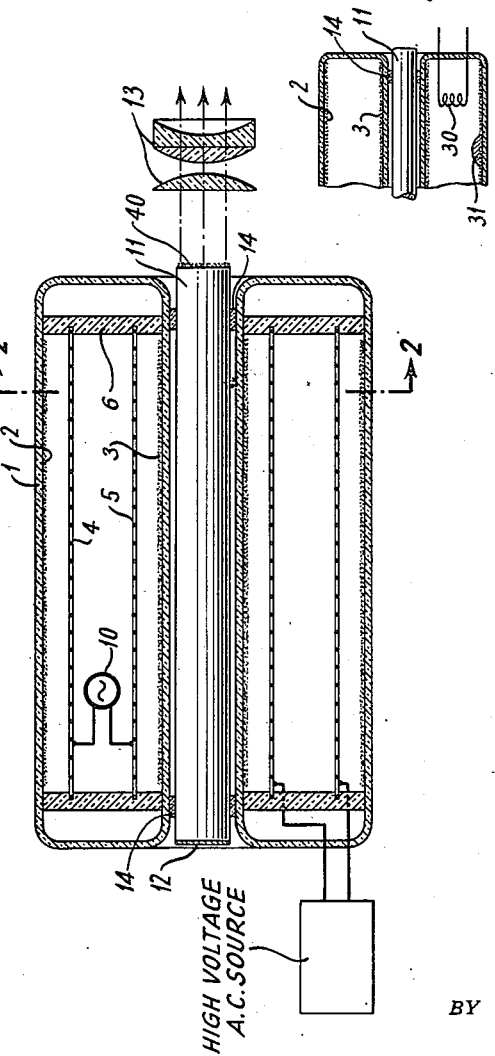
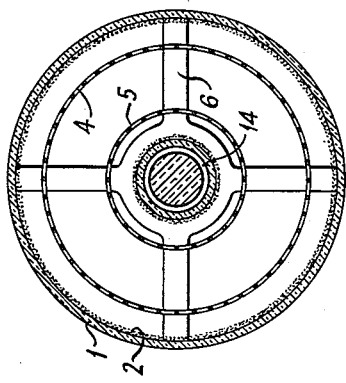
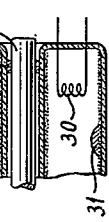
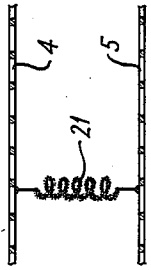
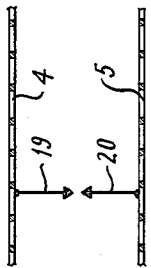
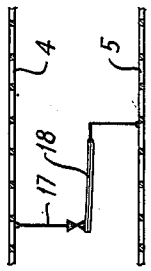
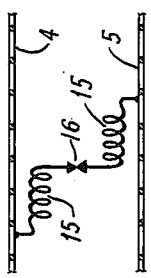
INVENTOR.
HUMBOLDT W. LEVERENZ
BY Charles McClair
ATTORNEY.

Patented Mar. 16, 1943

2,314,096

UNITED STATES PATENT OFFICE 2,314,096

LUMINESCENT LAMP

Humboldt W. Leverenz, South Orange, N. J., assignor to Radio Corporation of America, a corporation of Delaware Application March 22, 1941, Serial No. 384,630

9 Claims. (Cl. 176—122)

My invention relates to luminescent lamps and particularly to a new type of lamp having high intrinsic brilliance.

Luminescent lamps are known wherein a coating of finely divided phosphor or luminescent material is provided on the inner surface of an envelope, which material, upon excitation by corpuscular or radiant energy, becomes fluorescent with a soft luminescent glow. The intrinsic brilliance of such devices is quite low and they are not adapted for the production of light of high intrinsic brilliance. In my copending application, Serial No. 348,790, filed July 31, 1940, which is now U. S. Patent 2,298,947, granted October 13, 1942, I described a lamp of especially high intrinsic brilliance wherein the luminescent material was composed of solid elongated phosphor bodies. In this application I pointed out that a further disadvantage of lamps utilizing finely divided phosphor or luminescent materials resides in the fact that the luminescent material in such form absorbs as well as diffuses a considerable portion of the emitted light. I have found that this apparent disadvantage to which prior art lamps are subjected may be advantageously utilized in providing a lamp of high intrinsic brilliance. It is therefore an object of my invention to provide a luminescent lamp of high intrinsic brilliance without recourse to the use of luminescent solids comprising transparent phosphor members. It is a further object of my invention to provide a lamp of high intrinsic brilliance incorporating finely divided phosphor materials, and it is a still further object to provide such a lamp wherein extraneous loss of light is reduced to a minimum.

In accordance with my invention I provide an envelope of special form having therein a luminescent coating or plurality of coatings excitable by corpuscular or radiant energy with means separately disposed with respect to and spaced from the envelope for collecting and directing the developed light axially of the envelope, thereby concentrating the light and projecting it as a beam of relatively high intensity.

These and other objects, features and advantages of my invention will be apparent when taken in connection with the accompanying drawing wherein:

Figure 1 is a cross-sectional longitudinal view of a luminescent lamp device made in accordance with my invention;

Figure 2 is a cross-section of a lamp of Figure 1 taken along line 2—2;

Figures 3a–3d are schematic representations of an auxiliary incorporated with the lamp device of Figures 1 and 2, and Figure 4 is a cross-sectional view of a portion of a lamp modification made in accordance with my invention.

In my copending application, Serial No. 384,629, filed March 22, 1941, which is now U. S. Patent 2,296,643, granted September 22, 1942, I described a luminescent lamp utilizing a plurality of luminescent screens and electrodes capable of developing a flow of electrons to produce secondary electrons incident upon the luminescent coatings to develop light preferably of different spectral emission characteristics from each of the two luminescent coatings. Certain of the principles set forth in this prior application are incorporated in the lamp of Figures 1 and 2 wherein the envelope 1 is a developed annulus. Thus the cross-section of the envelope normal to the axis may be of any form, and by the term "developed annulus" I mean an envelope developed by revolving a bounding line of a plane figure about a point in the plane of the figure. Thus while I have shown a symmetric cylindrical type of envelope, other forms having an axial opening may be provided. One inner cylindrical surface of the envelope 1 is provided with a coating 2 of finely divided phosphor or luminescent material of a type having spectral emission characteristics in the short wave-length spectral band, such as in the violet or ultra violet portion of the spectrum, while the other cylindrical surface is provided with a second phosphor or luminescent coating 3 having a longer wavelength or visible spectral emission characteristic when excited by corpuscular or radiant energy. In accordance with my immediately above-mentioned application, I provide between the coatings 2 and 3 electron permeable electrodes 4 and 5 to sequentially accelerate and direct electrons upon each of the phosphor coatings. A cloud of electrons within the envelop 1 may be initiated by a starting device 10, and the developed electrons are subjected to an alternating potential field developed between the electrodes 4 and 5 by applying to these electrodes a source of alternating current potential. Thus, in accordance with the teachings of my said application, electrons are accelerated between and impinge upon the luminescent coatings 2 and 3 developing light in both the coatings 2 and 3, the light of coating 2 preferably being in the violet or ultra violet portion of the spectrum which is incident upon the coating 3, thereby intensifying the developed light in the visible portion of the spectrum.

In accordance with my present invention, I provide means to collect and direct the light from a separately disposed luminescent coating, such as the coating 3 as supplemented by light from the coating 2, said means comprising a transparent elongated member 11 positioned within the axial opening of the developed annular envelope 1 but removed from optical contact with the envelope or any luminescent coating associated with the envelope. Further in accordance with my invention, I provide an optically polished transparent light collecting means, such as the member 11 which is optically separated from the envelope or other medium by material having a refractive index of as near unity as possible. These features of my invention will be set forth with considerable detail below.

As indicated above, a coating of finely divided phosphor material has the property of dispersing and diffusing light in a number of directions, and the light liberated by the coating 3 is incident upon the transparent member 11 at various angles through the wall of the envelope 1. Since the member 11 is transparent, light incident thereon will tend to pass through the member, but light incident on the inner opposite surface from which light enters the member 11 at angles equal to or somewhat smaller than the critical angle of the particular material comprising the member 11 will be totally internally reflected and proceed to be similarly reflected as the light progresses axially of the member 11. This statement applies only in the event that the surface of the member 11 is optically smooth or polished and is out of optical contact with material having a high index of refraction, such as the glass wall of the envelope 1. It is therefore very undesirable to provide any material other than one having a refractive index of approximately unity, such as air or vacuum in contact with the longitudinal surface of the member 11. Thus light transmitting or absorbing materials having high indices of refraction approaching that of the member 11 when in optical contact therewith disperse the light being collected and prevent efficient total internal reflection along the length of the member. Any foreign matter such as a coating of luminescent material on the member 11 would thwart the efficient collection of light. It is therefore distinctly contrary to the teachings of my invention to provide a light diffusing member, but in accordance with my invention, I provide a member which is optically polished, transparent and homogeneous throughout its length. The member 11 is preferably composed of a high index of refraction material, such as a polished rod of transparent plastic, glass or quartz and may be provided at one end with a light reflecting coating 12 so that light approaching the coated end is reflected in the opposite direction and made cumulative with the light energy progressing in this direction. Obviously, the rod or member 11 may be of any geometrical cross-section rather than the circular section shown in the drawing. The light issuing from the opposite end of the member 11 from the reflector coating 12 may be collimated by the lens system 13 and used for various applications requiring a high intensity light beam.

In order to prevent inefficient collection of light by the member 11, the member is supported out of optical contact with the envelope 1, such as by opaque, preferably reflecting, spacers 14. The spacers may be located adjacent opposite ends of the member 11, and to further increase the useful light collected a reflector may be provided surrounding the outer surface of the envelope 1 as described in my first above-mentioned application. The envelope likewise may be immersed in an axial magnetic field to increase the length of the electron paths within the envelope 1 in accordance with the teachings of my copending application, Serial No. 381,032, filed February 28, 1941, thereby further increasing the light output of my device.

Referring to Figures 3a-3d, I have shown various modifications of the starting device 10 of Figure 1. The device of Figure 3a preferably comprises two electrically conducting coils 15, each coil being supported from one end and being in electrical contact with the electrodes 4 and 5. The free ends of the coils 15 are in normally closed position at the point 16 to allow an alternating current flow through the coils which become heated and expand, whereupon their ends become separated at the point 12 developing a small arc which serves as a source of primary electrons. The electrons then oscillate between the luminescent coatings 2 and 3 due to the alternating potential applied between the electrodes 4 and 5. Electrons impinging on the coatings 2 and 3 cause emission of secondary electrons, the action being cumulative until space charge limitation arises, whereupon the device is in full operation, liberating visible light from the coating 3 and violet or ultra violet light from the luminescent coating 2 which in turn increases the liberation of light from the coating 3. The form of starter shown in Figure 3b comprises two members 17 and 18 similarly connected to the electrodes 4 and 5. The member 18 may be of the bi-metallic type which, upon becoming heated by current flow through the normally closed contacts, becomes distorted, opening the circuit between electrodes 4 and 5 and initiating the discharge. The types of starters shown in Figures 3a and 3b are preferably designed so that the heat of operation of the lamp maintains the contact in an open position during subsequent operation of the lamp. A surge-type starter comprising members 19 and 20 shown in Figure 3c may be used to develop the initial cloud of electrons. The distance between adjacent ends of the members 19 and 20 may be made such that a spark occurs during maximum potential differences impressed between the electrodes 4 and 5. Increased separation after starting to prevent further discharge between the members 19 and 20 may be provided due to normal temperature rise during operation of the device. The starter shown in Figure 3d is of the continuously operative type and comprises an electron emitting filament 21 supported between and in conductive relation with the electrodes 4 and 5 to liberate electrons during operation of the device.

It will be appreciated that I am not limited in practicing my invention to the particular electrode structures shown in Figures 1-3 wherein excitation by means of corpuscular energy, such as by high velocity electrons is provided. Thus a lamp made in accordance with my invention as shown in Figure 4 may be utilized to provide the illumination of the centrally disposed member 11. Only one end of the lamp is shown in Figure 4, it being understood that the structure is symmetrical, both ends being of similar construction. The lamp device shown in Figure 4 utilizes a gaseous and vapor atmosphere to support a glow or vapor discharge, as well known in the luminescent lamp art. Thus two electron emitting filaments 30 may be provided at the opposite ends of the envelope, only one of which is shown, since the structure is symmetrical throughout the length thereof. Obviously, a filament and a cold electrode may be used at opposite ends of the envelope if desired. The envelope may contain a rare gas at sub-atmospheric pressure to aid in initiating a discharge between the filaments 30, and may likewise contain a small quantity of mercury or other vaporizable material shown at 31 which, upon becoming heated, vaporizes and supports the discharge between the filaments. Following starting of the device, the filaments 30 may be disconnected from their heating circuit, as well known in the operation of conventional lamps of this general type.

In accordance with my invention, the envelope 1 shown in Figure 4 is of elongated form and of annular cross-section, with the polished transparent member 11 axially supported within the axial opening of the envelope. The envelope 1, as pointed out in connection with Figures 1 and 2, may have luminescent phosphor coatings 2 and 3 supported on the interior wall of the envelope. In operation, the glow or vapor discharge, if supported by mercury vapor at low pressure, is very high in ultra violet radiation at 2537 Ångstroms (Å). The coating 2 is therefore preferably chosen to liberate light under a low pressure mercury discharge having its predominant spectral emission at 2537 A. The material of the coating 2 is thus chosen to liberate light of a somewhat longer wavelength than 2537 Å, which longer wavelength light, when incident upon the coating 3 liberates light of still longer wavelength in the visible portion of the spectrum. The material of the coating 3 thus liberates visible light due to excitation from the ultra violet radiation of the discharge as well as by radiation from the coating 2.

The finely divided materials comprising the coatings 2 and 3 in the modifications described above therefore are chosen with reference to their spectral emission characteristics. The coating 2, in the case of electron excitation, may be an ultra violet emitting phosphor, such as silver activated zinc sulphide, copper activated beryllium zirconium silicate or pure alumina (crystallized at a temperature greater than 1500° C.), whereas the coating 3 may have visible light emitting properties, suitable materials being manganese activated zinc beryllium silicate, copper or silver activated zinc cadmium sulphides, copper activated zinc sulphide, manganese activated zinc germanate, manganese activated zinc and cadmium borates, etc. The coating 2 of the modification of the Figure 4 preferably comprises a phosphor or combination of phosphors having spectral emission characteristics intermediate to that of the glow discharge and that of the coating 3. In this manner the light output may be greatly intensified in the coating 3. Suitable examples of phosphor materials for use with a mercury vapor discharge are for coating 2: low cadmium content zinc cadmium sulphides (silver or copper activated), copper or silver activated zinc sulphide, manganese activated zinc germanate, and for coating 3: high cadmium content zinc cadmium sulphides (silver or copper activated), silver or copper activated zinc cadmium manganese sulphides, and silver or copper activated zinc sulpho-selenides. It will be noted that all of the above-mentioned phosphors are of the inorganic type, which type I have found particularly suitable for use in vapor discharge devices.

It will be appreciated that the cumulative effect of light incident upon the member 11 is continuous over its length and the length of the lamp, and for this reason a substantial proportion of the light from the luminescent coating 3 may be collected and concentrated to constitute a small light source of high intrinsic brilliance. The reflective coating covering the outer envelope wall may be used to conserve the light, as described in connection with the lamp of Figures 1 and 2.

In the development of luminescent materials for use in devices of the type described I have found that certain phosphors have practically no upper excitation limit for converting light of a higher frequency into light of a lower frequency. Thus materials luminescent under ultra violet light have substantially no saturation effects so that the light output is substantially proportional to the input ultra violet energy, notwithstanding exceptionally high values of the incident ultra violet light input. Therefore, in accordance with a further teaching of my invention, I may provide the envelope 1 or a portion thereof, as well as the member 11 of material transparent to ultra violet radiations and develop light predominantly of ultra violet frequency by the choice of suitable phosphors comprising the coatings 2 and 3. In accordance with this teaching of my invention, I provide either on or adjacent the end of the member 11 opposite that bearing the reflector coating 12 a relatively thin luminescent coating of phosphor material excitable by ultra violet light. More specifically, for this type of an arrangement the coating 2 may comprise finely divided aluminum oxide to develop ultra violet light of short wavelength or high frequency. The material of coating 3 is then chosen to develop ultra violet light of relatively longer wavelength which passes through the envelope and into the ultra violet transparent member 11. The ultra violet light is cumulative, as indicated above and is directed upon a luminescent screen 40 which is of a phosphor material or combination of phosphors liberating visible light under violet or ultra violet excitation. The amount of light collected over the length of the member 11 and delivered to the luminescent screen 40 is limited only by the transparency of the member 11, since the member is highly polished and is surrounded by material of low refractive index. Furthermore, since materials such as certain silica glasses and quartz are highly transparent to ultra violet light, the amount of ultra violet light available at the luminescent screen 40 is substantially unlimited. Inasmuch as the material comprising the luminescent screen 40 has substantially no saturation characteristics with respect to utilization of ultra violet light, the luminescent screen 40 will luminesce with great brilliancy. Thus the light from the luminescent screen 40 may be collimated and projected by the lens system 13 as a beam of very great intensity.

In my copending application first referred to above I described a lamp utilizing solid transparent phosphor bodies cumulatively excitable to luminescence over the length thereof. Such a phosphor body may be utilized as the member 11, in which case the phosphor member 11 comprises a solid body made in accordance with my prior application teaching. Thus the material of the member 11, if of a phosphor, may be such as to liberate light of a frequency lower than that of the coating 3 or intermediate that liberated by the coating 3 and the screen 40 so that the light developed by the phosphor member 11 excites the material of the screen 40 to luminescence of longer wavelength. The lamp of Figure 4 may be designed in accordance with these teachings of my invention to develop luminescence in the violet or ultra violet portion of the spectrum and a similar luminescent screen excitable in the visible spectrum by incident violet or ultra violet light used in combination with the transparent member 11, whether of phosphor material or not, to develop light of high intensity.

It will be appreciated that I have provided a device which is an improvement upon the device of my first-mentioned application in that readily available finely divided luminescent materials may be used while retaining the advantages of a light source of exceptionally high intrinsic brilliance. Therefore, while I have indicated only a few structural modifications of my luminescent lamp, it will be appreciated that many modifications utilizing the principles herein set forth may occur to those skilled in the art, and I do not wish to be limited in the practicing of my invention except as set forth in the appended claims.

I claim:

1. A luminescent lamp comprising an envelope, a coating of luminescent material within said envelope, means to excite said coating to develop luminescent light, and means comprising an elongated transparent member with its surface out of optical contact with said envelope and directly exposed to a medium of refractive index lower than that of glass and to said coating to collect the developed light and project said collected light axially of said member.

2. A luminescent lamp comprising an elongated envelope having an axial opening, an optically smooth transparent elongated member supported within said opening but out of optical contact with said envelope, said member being immersed in material of refractive index lower than that of glass, a luminescent coating within said envelope exposed to the smooth surface of said member, and means to excite said coating to develop luminescent light incident on said member whereby the developed light is collected, concentrated and projected axially of said member.

3. A high intensity luminescent lamp comprising an envelope, a plurality of finely divided light diffusing inorganic luminescent phosphors within said envelope excitable to different spectral emission bands whereby one of said phosphors, when excited to luminescence, excites another of said phosphors to luminescence, means to excite said phosphors to luminescence, a solid optically smooth member transparent to the spectral emission band of said other phosphor exposed to said other phosphor to collect and concentrate light developed within said envelope as a light beam of high intensity and a transparent medium having a refractive index of substantially unity between said other phosphor and the optically smooth surface of said solid member to increase the total internal reflection of light within said member.

4. A luminescent lamp comprising an envelope, portions of which are substantially transparent to short wavelength light, a coating of luminescent material excitable to relatively short wavelength light within said envelope, means to excite said coating to luminescence, a transparent optically smooth member symmetrically disposed with respect to said envelope and exposed to said coating to collect light therefrom, and phosphor means comprising a material excitable to said short wavelength light on one end of said member to develop light of longer wavelength from the light collected by said member.

5. A luminescent lamp comprising a cylindrical envelope, a cylindrical coating of light diffusing luminescent material within said envelope, means to excite said coating to luminescence, and a transparent optically smooth elongated member having its elongated surface directly exposed to said coating to collect light from said coating, a reflector adjacent one end of said member, and a luminescent screen adjacent the opposite end of said member, said screen being of a material having a spectral emission band peaking at a longer wavelength than the material of said coating whereby said screen is excited by the luminescence of said coating.

6. A luminescent lamp comprising an envelope, a phosphor coating within said envelope, means to excite said coating to luminescence, an elongated optically smooth transparent member exposed to said coating, said member consisting of a solid transparent phosphor body of material having a spectral emission wavelength of lower frequency than the material of said coating to develop light from the luminescence of said coating.

7. A lamp as claimed in claim 6 including a luminescent phosphor screen adjacent one end of said member, said phosphor screen being of material having a spectral emission wavelength of lower frequency than the said solid phosphor body.

8. A luminescent lamp comprising an elongated envelope, a plurality of inorganic luminescent coatings within said envelope, each coating comprising a luminescent phosphor having a different spectral emission wavelength, means to excite at least one of said coatings to luminescence whereby the other coating is excited by light from said one coating, an elongated transparent member having an optically smooth surface directly exposed to one of said coatings to collect light therefrom and project said light axially of said member, and a luminescent screen adjacent one end of said member, said screen having a spectral emission wavelength of lower frequency than each of said coatings whereby light of relatively short wavelength collected by said member is converted into light of relatively long wavelength.

9. A luminescent lamp comprising an elongated envelope, a light diffusing luminescent coating on an inner wall of said envelope, means to excite said coating to luminescence and means consisting of a transparent elongated solid phosphor member having an optically smooth surface centrally disposed of said envelope and having its smooth surface out of optical contact with said envelope, a medium having a refractive index of substantially unity between said envelope and said member over substantially the entire length of said member and through which said member may collect diffused light from said coating, convert said light into light of longer wavelength and project said longer wavelength light axially of said member.

HUMBOLDT W. LEVERENZ.